(12) United States Patent
Zhao et al.

(10) Patent No.: US 11,226,804 B2
(45) Date of Patent: Jan. 18, 2022

(54) STAGED ROLLOUT FRAMEWORK FOR FEATURE RELEASE

(71) Applicant: Uber Technologies, Inc., San Francisco, CA (US)

(72) Inventors: Zhenyu Zhao, Mountain View, CA (US); Mandie Liu, Daly City, CA (US); Anirban Deb, Fremont, CA (US); Akash Parikh, San Francisco, CA (US); Sisil Mehta, Berkeley, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/507,991

(22) Filed: Jul. 10, 2019

(65) Prior Publication Data

US 2020/0019400 A1    Jan. 16, 2020

Related U.S. Application Data

(60) Provisional application No. 62/698,761, filed on Jul. 16, 2018.

(51) Int. Cl.
*G06F 8/65* (2018.01)
*G06F 8/71* (2018.01)
*G06F 11/34* (2006.01)
*G06F 11/30* (2006.01)

(52) U.S. Cl.
CPC .................. *G06F 8/65* (2013.01); *G06F 8/71* (2013.01); *G06F 11/302* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 2009/0319848 A1* | 12/2009 | Thaper | G06F 8/64 714/748 |
| 2010/0169200 A1* | 7/2010 | Gomes | G06Q 40/00 705/35 |
| 2014/0237465 A1* | 8/2014 | Lin | G06F 8/656 717/173 |
| 2018/0173517 A1* | 6/2018 | Shantharam | G06F 8/65 |
| 2018/0189046 A1* | 7/2018 | Kunisetty | H04L 41/082 |
| 2018/0232222 A1* | 8/2018 | Conforti | G06F 8/65 |

(Continued)

*Primary Examiner* — Philip Wang
(74) *Attorney, Agent, or Firm* — Fenwick & West LLP

(57) ABSTRACT

An application update system performs staged rollouts to push new versions or features of applications to users quickly and with minimal negative impact to the users. The application update system allocates users of an application to populations. The populations specify a subset of users to receive a feature update for the application. The application update system performs a staged rollout of the feature update by iteratively pushing the feature update to the identified subset of users, monitoring the performance of the feature update, and, based on the performance, the application update system reallocates users to populations. For example, when the feature update performs successfully, the application update system allocates additional users to receive the feature update. When all users of the application have received the feature update, the staged rollout is designated as complete.

18 Claims, 4 Drawing Sheets

(56) References Cited

U.S. PATENT DOCUMENTS

| | | | | |
|---|---|---|---|---|
| 2018/0302303 A1* | 10/2018 | Skovron | ............... | H04L 43/065 |
| 2018/0349133 A1* | 12/2018 | Wolf | ..................... | G06F 16/162 |
| 2018/0375730 A1* | 12/2018 | Anand | .................... | G06F 9/455 |
| 2019/0042228 A1* | 2/2019 | Nolan | ........................ | G06F 8/64 |
| 2019/0146773 A1* | 5/2019 | Attard | ....................... | G06F 8/61 |
| | | | | 717/169 |

* cited by examiner

STAGED ROLLOUT FRAMEWORK FOR FEATURE RELEASE

CROSS REFERENCE TO RELATED APPLICATIONS

This application claims the benefit of U.S. Provisional Application No. 62/698,761, filed Jul. 16, 2018, which is incorporated by reference in its entirety.

BACKGROUND

This disclosure relates generally to releasing updates to user applications, and more specifically to automatically releasing updates to user applications in a staged rollout framework.

Client devices and their installed applications provide various functions to a user through the execution of software packages included in the application. For example, an application can provide a function to connect users to coordinate travel by providing the ability to access information on the internet, send messages between users, etc.

During web and mobile software product development cycles, innovations and improvements are made to applications and similar products by rolling out new versions or features. Rollout of the new versions or features requires changes to be made to the code base on the client or server sides. The new versions and features are typically tested prior to rollout to ensure that there is little to no negative impact on users. However, it is possible for modifications to the application (at the client or the server) to introduce errors that were not identified during the testing phase. For example, errors in new features rolled out may cause the application to crash, slow performance of the application, or otherwise interfere with the functionality of the application, resulting in a poor user experience. In cases where these errors occur and when the rollout is not monitored or contained, the problematic version may impact a large number of users and be difficult to revert to a prior version. In the meantime, many users may be affected by the problematic modifications.

SUMMARY

An application update system performs staged rollouts for new versions or features of applications. During a staged rollout, the application update system introduces a new version or feature to a small proportion of users and gradually ramps up to a larger population based on real-time evaluation of the performance of the new version or feature.

The application update system allocates users of the application to populations. Each population identifies a subset of users to receive an update for the application. The staged rollout of the update for the application is performed by iteratively pushing the update for the application to a first identified subset of users, monitoring the performance of the update, and reallocating users to the population based on the performance of the update and an algorithm for reallocation of the users. For example, the application update system evaluates the performance of the update based on frequency or number of application crashes, slowdown of the application, battery drain, execution of one or more features of the application, or frequency or number of user complaints. Responsive to a positive evaluation of the performance of the update, the application update system ramps up the rollout process. Responsive to a negative evaluation of the performance of the update, the application update stops the ramp-up.

The application update system uses a specified algorithm to perform a ramp-up for version or feature updates. Algorithms are automated and determine when and how to ramp up to the next stage of the staged rollout (e.g., when and how to reallocate users of an application or user devices 110 storing instances of the application to populations to receive or remove a version or feature update). Algorithms may be time-based, power-based, or risk-based schedules for ramping up the staged rollout. The application update system determines that the staged rollout is complete when, using the specified algorithm, the version or feature update has been pushed to all users of the application.

By implementing a staged rollout of version or feature updates and applying an automated algorithm for ramping up release of the version or feature update, the application update system reduces the impact of errors in the updates on users of the application while rolling out healthy features or updates quickly.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
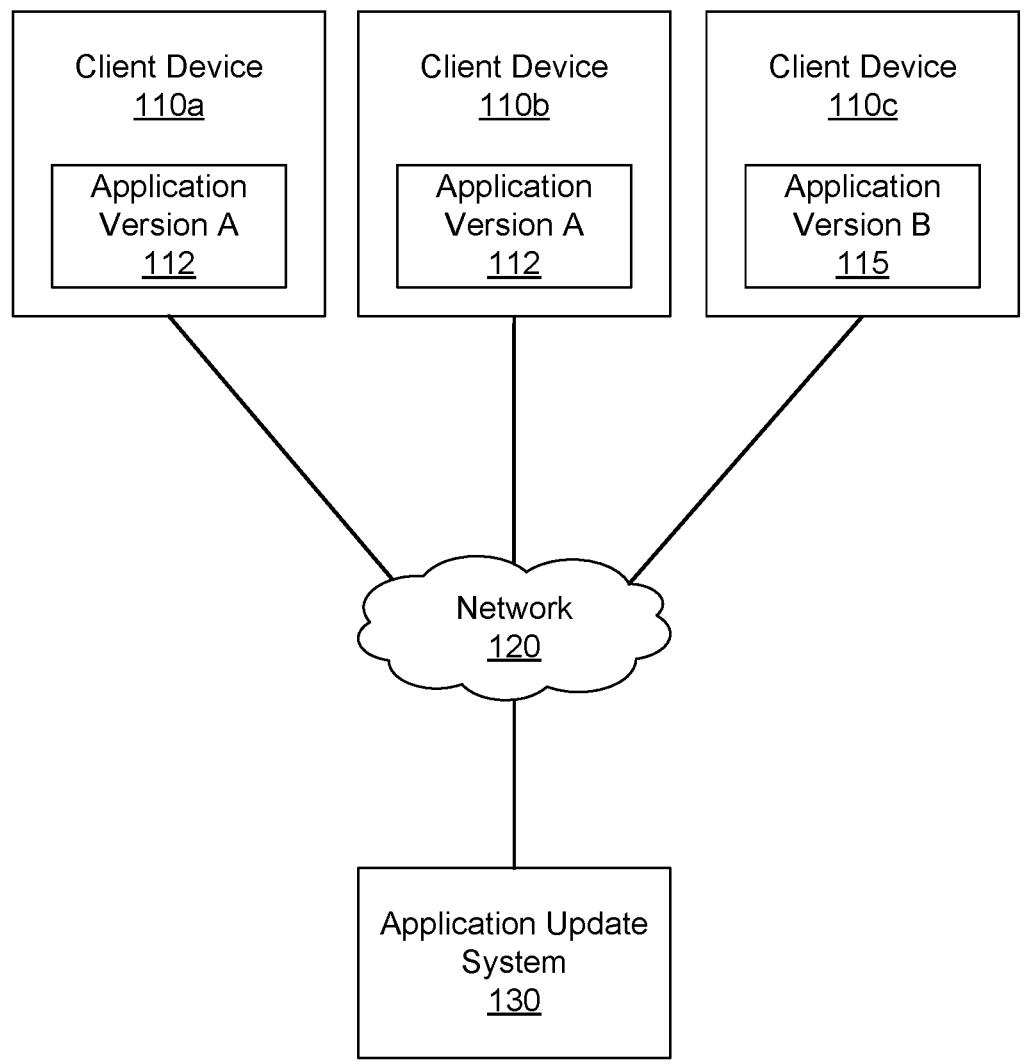
FIG. 1 is a block diagram of a system environment for an application update system, in accordance with an embodiment.

FIG. 1 is a high-level block diagram of a system environment for an application update system 130, in accordance with some embodiments. FIG. 1 includes one or more client devices 110, a network 120, and the application update system 130. Alternate embodiments of the system environment can have any number of user devices 100 as well as multiple systems 130. The functions performed by the various entities of FIG. 1 may vary in different embodiments.

The application update system 130 identifies users of an application to receive a feature update and pushes the feature update to the identified users. As used in this disclosure, "pushing" a feature update or other software refers to deploying the feature update (e.g., to a user device 100) by the application update system 130 to implement a modification of the operation or functionality of the application. A feature update performs a change to the application or other software product that involves a code or configuration change. The change may occur in the client device codebase or in a backend system codebase associated with the application. For example, a feature update may include pushing a new version of an application (e.g., a version of an application including one or more modified executables), activating a previously deactivated feature or deactivating a previously active feature, or altering backend code that does not visibly impact user experience. These various types of modifications are referred to generally herein as a feature update, and reflect a transition from a previous version to an updated version of the application. In one embodiment, the feature update is rolled out (over time) to all users of the application. In another embodiment, the feature update is rolled out to a subset of the users of the application (e.g., when a feature is being tested but must still be safely rolled out).

The application update system 130 allocates users of the application to one or more populations including a first population to receive the feature update and a second population that continues to use the previous version. Although termed "users" in this example, the allocation of a configuration may be performed based on individual devices or device identifiers which may be considered unique "users" for allocation to populations for the application update and monitoring. In some embodiments, each of these groups of users is monitored to determine performance of the feature update relative to the previous version. In addition, a third set of users may include a holdout group, who may continue to use the previous version but for whom performance is not analyzed or compared to other groups.

The application update system 130 pushes the feature update to the first population of users and monitors the performance of the feature update. Based on the performance of the feature update, the application update system 130 reallocates users of the application to the one or more populations over time. For example, when the feature update performs successfully against one or more specified performance metrics, the application update system 130 reallocates additional users of the application to the first population identified to receive the feature update and pushes the feature update to the users. Additional users may also be reallocated from the holdout group to increase the total number of users being tested and monitored. The application update system 130 performs the steps of monitoring the performance of the feature update and reallocating users to populations based on the performance of the feature update iteratively until a problematic feature is identified or the rollout of the feature update is complete.

The application update system 130 interacts with client devices 110 to push feature updates. Client devices 110 can be personal or mobile computing devices, such as smartphones, tablets, or notebook computers. The client devices 110 comprise an application version A 112 or an application version B 115, wherein application version A represents the application prior to receiving the feature update and application version B represents the application after receiving the feature update. In this example, client device 110c has received the update and updated to application version 115 (and is in the population to be updated), while other client devices 110a, 110b continue to use application version A 112.

In some examples, the version update is implemented via feature flags in an application. In this configuration, the same executable "version" of an installed application at the client device may include various configurable settings that may be activated or deactivated by setting feature flags on the application. Accordingly, to provide the update with respect to a particular feature for a population receiving the update, the feature flag related to that update may be changed to activate or deactivate that feature. In this configuration, any variation or change in monitored characteristics of the application may be more confidently attributed to the modified feature flag rather than to any unexpected effects of a different installed application.

The client devices 110 receives updates and other communications from the application update system 130 via the network 120, which may comprise any combination of local area and wide area networks employing wired or wireless communication links. In some embodiments, all or some of the communication on the network 120 may be encrypted.

Figure 2:
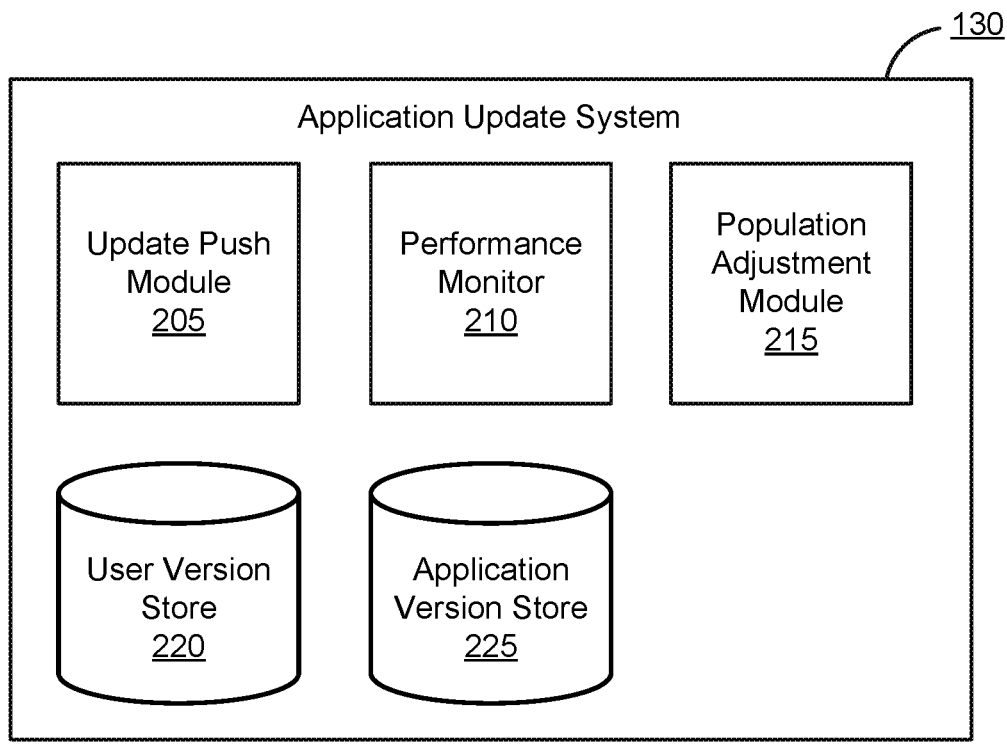
FIG. 2 is a block diagram of an architecture of the application update system, in accordance with an embodiment.

FIG. 2 is a block diagram of a system architecture for the application update system 130, in accordance with some embodiments. The application update system 130 includes various modules and data stores to update application versions and control rollout of the update to various client devices 110. The application update system 130 includes an update push module 205, a performance monitor 210, a population adjustment module 215, a user version store 220, and an application version store 225. Additional components such as web servers, network interfaces, security functions, load balancers, failover servers, management and network operations consoles, and the like are not shown so as to not obscure the details of the system architecture. Additionally, the application update system 130 may contain more, fewer, or different components than those shown in FIG. 2 and the functionality of the components as described herein may be distributed differently from the description herein.

The update push module 205 accesses the user version store 220 to identify users of the application to receive a feature update and pushes the feature update to client devices 110 associated with the identified users. This may be performed when client device accesses the application update system 130, e.g., to receive a service provided by the application. To update the applications, when a client device accesses the application update system 130, the update push module identifies which population the device (or user) is associated with and checks whether the client device is executing the version associated with the version update. When the version on the device differs from the population of the device (e.g., because the device was moved from one population to another) the application update system 130 updates the application. The application update may be performed in various ways, such as by sending the updated application to the client device or by notifying the application to access the appropriate application version at another system. In cases in which configuration or other access parameters are changed by the update, the version update may be performed by setting those parameters on the device.

The performance monitor 210 monitors the performance of the feature update for the application based on specified performance metrics. In one embodiment, the performance monitor 210 identifies if the updated application contains a failing feature or function that results in abnormal operation of the application. For example, the performance monitor 210 identifies cases where abnormal operational requests are generated by users of the updated application, an operational request is not executed after a certain amount of time, the response time of an executed operational request is abnormal (e.g., above or below a threshold), a generated operational request is repeatedly executed (e.g., an execution loop), a generated operational request is not executed, an executed operational request results in an abnormal response (e.g., querying a GPS of the client device 110 returns the device time), or any other analyses of an operational request that indicates the application is functioning abnormally. In other cases, the performance monitor 210 receives normal operational requests or status communications from the application. For example, the application may report when a user interacts with a particular interface element (e.g., a user presses a "continue" button) or when a user selects a given operation or service from the application.

The performance monitor 210 may also perform analytics on the operational requests and other operation of the applications across populations. These analytics may be performed to determine the statistical variance of a characteristic across populations having the different application versions. In addition to variance, the statistical power of a sample may also be determined, which describes the statistical confidence of detecting a variance or other difference between the population receiving the update and the population continuing to use the previous version. As one example metric, these statistics may be used to measure a clickthrough rate on a given interface of the application. This determination may use various techniques, such as the delta, bootstrap, and delete-a-group jackknife methods to measure statistical variation and statistical power. The delta and bootstrap methods are variance estimation approaches that correct statistical variance without assuming that metrics (e.g., clickthrough rates, impressions, etc.) are independent between observations. The delta method uses a Taylor series expansion to approximate statistical variance. The bootstrap method uses resampling to estimate statistics for a population by sampling a set of data with replacement. Both the delta and bootstrap methods require storage of raw data and are difficult to implement in real-time or with limited data storage. The delete-a-group jackknife method splits users into partitions with equal probability and estimates statistical variance based on a metric mean for all users and a mean for users within partitions. In one embodiment, the performance monitor 210 uses a delete-a-group jackknife method in order to reduce the storage of raw data required by other methods such as the delta method and bootstrap method.

These techniques may also account for variation of different users within a population who may otherwise appear to create more than one action. For example, a particular user may view the interface more than once and proceed each time. These statistical techniques may account for various effects attributable to particular users rather than to the different treatment.

Given a sample size of users using the application in the different populations and the length of time that the users have been using the application, the statistical analysis may also calculate a minimum detectable effect (MDE) or minimum detectable difference that is detected with a given statistical confidence (e.g., statistical power). For example, the performance monitor may determine whether a variance below a specified MDE threshold can be calculated for the populations receiving and not receiving the update with respect to a given metric and within a specified statistical certainty (e.g., $80^{th}$ percentile of the likely distribution).

In one embodiment, the performance monitor 210 alerts the application update system 130 when the performance of the updated application reaches a specified threshold value. For example, the specified threshold value is a total number of abnormal operation notifications. In one embodiment, an alert from the performance monitor 210 indicating that the feature update is performing unsuccessfully may result in the rollback or temporary stop of the feature update.

The frequency of various operational requests and performance may be measured by the performance monitor 210 and compared between the population of users receiving the updated application and the population of users continuing to use the prior version.

The population adjustment module 215 allocates users of the application into populations for receiving the feature update from the application update system 130. The population adjustment module 215 accesses and updates the user version store 220 to indicate populations associated with the users. In one embodiment, the population adjustment module 215 applies a ramp-up algorithm to allocate users of the application into populations, such that the percentage of users receiving the feature update is increased over time unless the performance metrics indicate an unacceptable deviation in measured metrics with sufficient confidence. This may be determined by identifying that the likelihood of an adverse variance is above a threshold for the population group. The transition of users from the population not receiving the update to a population receiving the update may be performed continuously or may be performed in discrete stages. For example, in a first stage, 2% of all eligible users for the updated version may be selected for performance monitoring, and may be split among the first population that receives the update and the second population that does not receive the update. These groups may be monitored, and based on the performance the next stage may increase the portion of users exposed to the version update according to a rollout algorithm.

In one embodiment, the population adjustment module 215 allocates users using a time-based ramp-up rollout algorithm. The time-based ramp-up schedule uses a series of specified stages and corresponding user percentage before the rollout of the feature update begins. In addition, the time-based ramp-up schedule requires a specified time between stages. After the rollout starts, if no alert is received by the performance monitor 215 for the specified time, the population adjustment module 215 performs the next stage of the rollout by increasing the number of users receiving the update. For example, if the rollout is specified to occur linearly over five stages, and the time between stages is specified to be a day, the population adjustment module 215 allocates 20% of the users to a population to receive the feature update on the first day. If no alert occurs before a day passes, the population adjustment module 215 allocates another 20% of the users to receive the feature update, thus totaling 40% of users to receive the feature update. The time-based ramp-up schedule typically does not adapt to information collected during the rollout period, and accordingly may ramp up too quickly or slowly in particular scenarios relative to possible problems with the update. For example, the time-based ramp-up schedule may ramp up too quickly in cases where the performance monitor 210 indicates that the risk and uncertainty is high. In another example, the time-based ramp-up schedule may ramp up too slowly in cases where the performance monitor 210 indicates that the risk and uncertainty is low.

In another embodiment, the population adjustment module 215 allocates users using a power-based ramp-up. The power-based ramp-up automatically adjusts the number of users allocated to populations based on a specified rollout goal with respect to statistical power or confidence that the effect on measured metrics is at or below a designated MDE. Using the power-based ramp-up schedule, the population adjustment module 215 identifies for each stage a number of users to be allocated to receive the feature update based on an equation as follows.

$$\text{number of users} = \min(N_{\delta,\beta}, N_{\delta,\beta}, N_{stage\_limit}) \qquad \text{Eq. 1}$$

As shown in Equation 1, $N_{stage\ limit}$ is the maximum number of users allowed to be reallocated at a given stage. $N_{\delta,\beta}$ is the number of users corresponding to a pre-defined minimum detectable difference (e.g., MDE) in statistically analyzing the performance of the feature update. $N_{\hat{\delta},\beta}$ is the number of users corresponding to the observed difference of the previous stages. Using the equation and performance information from the previous stage or stages, the population adjustment module 215 determines a number of users to allocate for the next stage and iteratively applies the equation for the following stage or stages. The application of this equation ensures that the ramp-up period does not risk too many users being negatively impacted if the performance of the feature update is negative. In this case, the additional number of users for a stage may be modestly increased to gain additional statistical power without significantly increasing the number of users effected by the version change. When the rollout proceeds smoothly, however, and with no or positive (e.g., beneficial) variation, the number of users may increase more quickly because the expected confidence of negative impact is low. In some cases when the statistical power is high that there is not a deviation above acceptable effects, the ramp up may be limited by a maximum ramp-up proportion for each stage to ensure that the ramp-up speed is not too aggressive.

In another embodiment, the population adjustment module 215 allocates users using a risk-based ramp-up. The risk-based ramp-up schedule proceeds with the rollout at the maximum allowed speed on a tolerable risk level with respect to certain metrics. The tolerable risk level is specified prior to the rollout and may be a specific type of failure experienced by users. For example, the tolerable risk criteria may be a threshold number of users experiencing an operational failure. In this example, the total number of instances that the failure may occur doing the rollout (attributable to the version change) is limited by adjusting the population size according to the likely difference in failure rates, current number of failures, and corresponding risk of exceeding the total allowable failure rate with an increased population size. For each stage, the population adjustment module 215 calculates the maximum number of additional users that may be exposed to the risk specified in the risk criteria based on the performance information for the previous stage or stages. In one embodiment, the population adjustment module 215 additionally applies minimum and maximum conditions to the risk-based ramp-up schedule to ensure that the number of users identified to receive the update increases over time (unless reverted to zero, e.g., by an alert from the performance monitor 210) and does not exceed a maximum percentage. When the total number of failures reaches the total allowable amount, the rollout may be stopped or reversed to prevent additional failures above the allowed risk for the rollout.

The user version store 220 stores and maintains data identifying users of the application and associated application version information. For example, the user version store 220 is a database of users of the application that associates each user with a version of the application. When a feature update is being rolled out, a subset of users in the user version store 220 are associated with a version of the application including the feature update. In one embodiment, the subset of users associated with the updated version of the application is flagged for identification.

The application version store 220 stores and maintains data representing one or more versions of the application. Versions of an application may represent any change in code from a base or previous version of the application. For example, a version of an application includes an additional, altered, or removed feature. Changes in code may include alterations to the frontend or backend of the application, and may be stored by the application version store 220 as an alteration to an existing version of the application or as a full version of the application.

Figure 3:
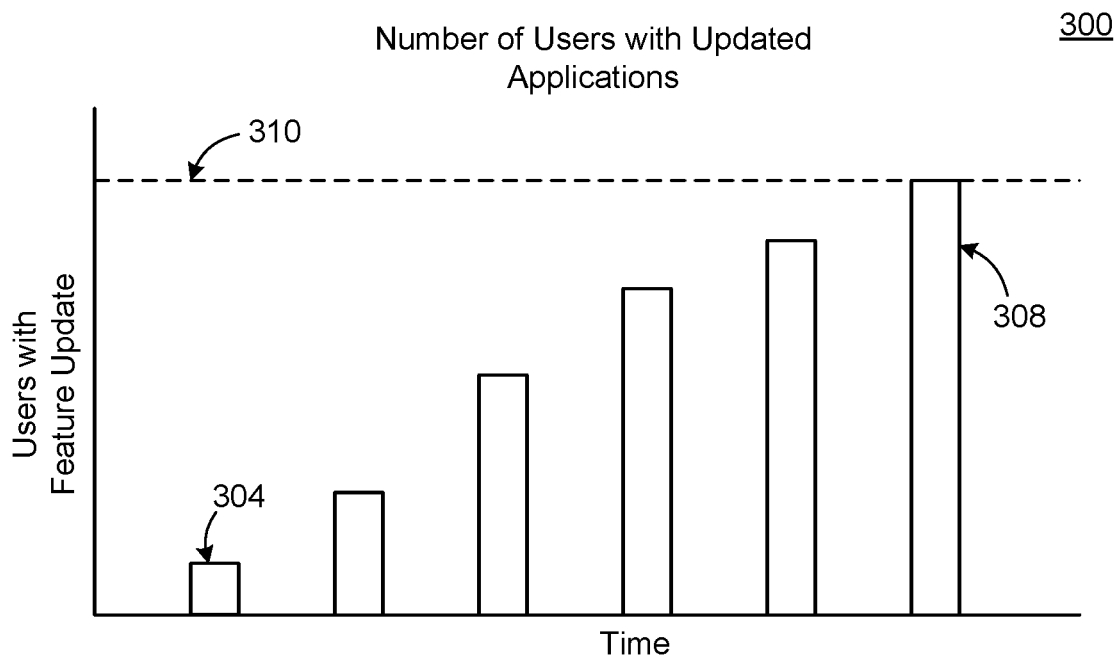
FIG. 3 is an example illustrating number of users of an application to receive updates over time using a staged rollout, in accordance with an embodiment.

FIG. 3 is an example illustrating number of users of an application to receive updates over time using a staged rollout. FIG. 3 shows a graph 300 illustrating a number of users over time to receive the feature update from the application update system 130. In the example of FIG. 3, the feature update is designated to be released to total population 310 of users of the application. In other examples, the feature update is designated to be released to a subset of the total users of the population. When the rollout of the feature update begins, a small percentage 304 of users is identified to receive the rollout as the first stage. During the first stage of the staged rollout, the application update system 130 monitors the performance of the feature update based on one or more performance metrics. For example, the performance metrics identify a frequency or number of crashes experienced by users with the feature update. Based on the performance of the feature update, the application update system 130 determines whether to proceed with rolling out the feature update.

In the case of FIG. 3, the application update system 130 proceeds with the staged rollout. The percent of users to receive the feature update increases iteratively across a number of stages until a final stage, wherein the final number 308 of users to receive the feature update reaches the full set of users 310 designated to receive the update. During each stage of the rollout, the application update system 130 monitors the performance of the feature update and determines based on the one or more performance metrics to proceed with the staged rollout.

Figure 4:
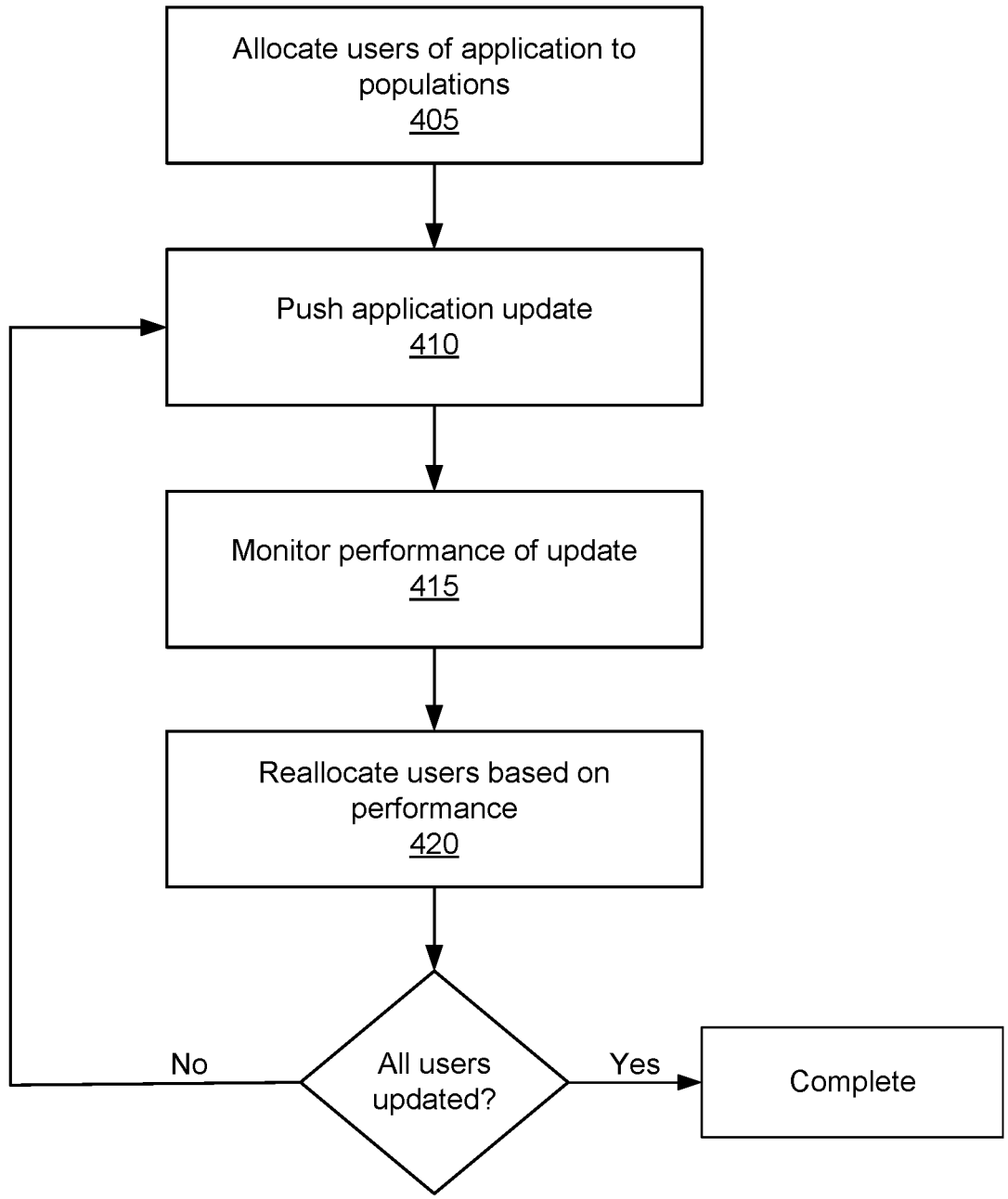
FIG. 4 is a flow diagram of a method for updating application features for a population of users using a staged rollout, in accordance with an embodiment.

FIG. 4 is a flow diagram of a method for updating application features for a population of users using a staged rollout. In various embodiments, the method may include different and/or additional steps than those described in conjunction with FIG. 4.

The application update system 130 allocates 405 users of an application to populations. The populations identify a subset of users to receive a feature update being rolled out. The application update system 130 pushes 410 the application feature update to the population of users identified to receive the update. The application update system 130 monitors 415 the performance of the feature update. Based on the performance of the feature update, the application update system 130 reallocates 420 the users of the application. For example, if the feature update performs successfully according to specified performance metrics, the application update system 130 allocates additional users to receive the feature update. The application update system 130 performs a check to determine if all users of the application have received the feature update. If a subset of users has not received the feature update, the application update system 130 iteratively performs the steps of pushing 410 the application feature update, monitoring 415 the performance of the feature update, and reallocating 420 users of the application based on the performance until the rollout of the feature update is complete for all users of the application.

In one embodiment, a test group of users is specified as the total population for the feature update. For example, in the case that the application update system 130 is testing a feature update for a localized group of users (e.g., by geographic region, by member status, etc.), the rollout of the feature update is designated as complete when all users of the test group have received the feature update.

Figure 5:
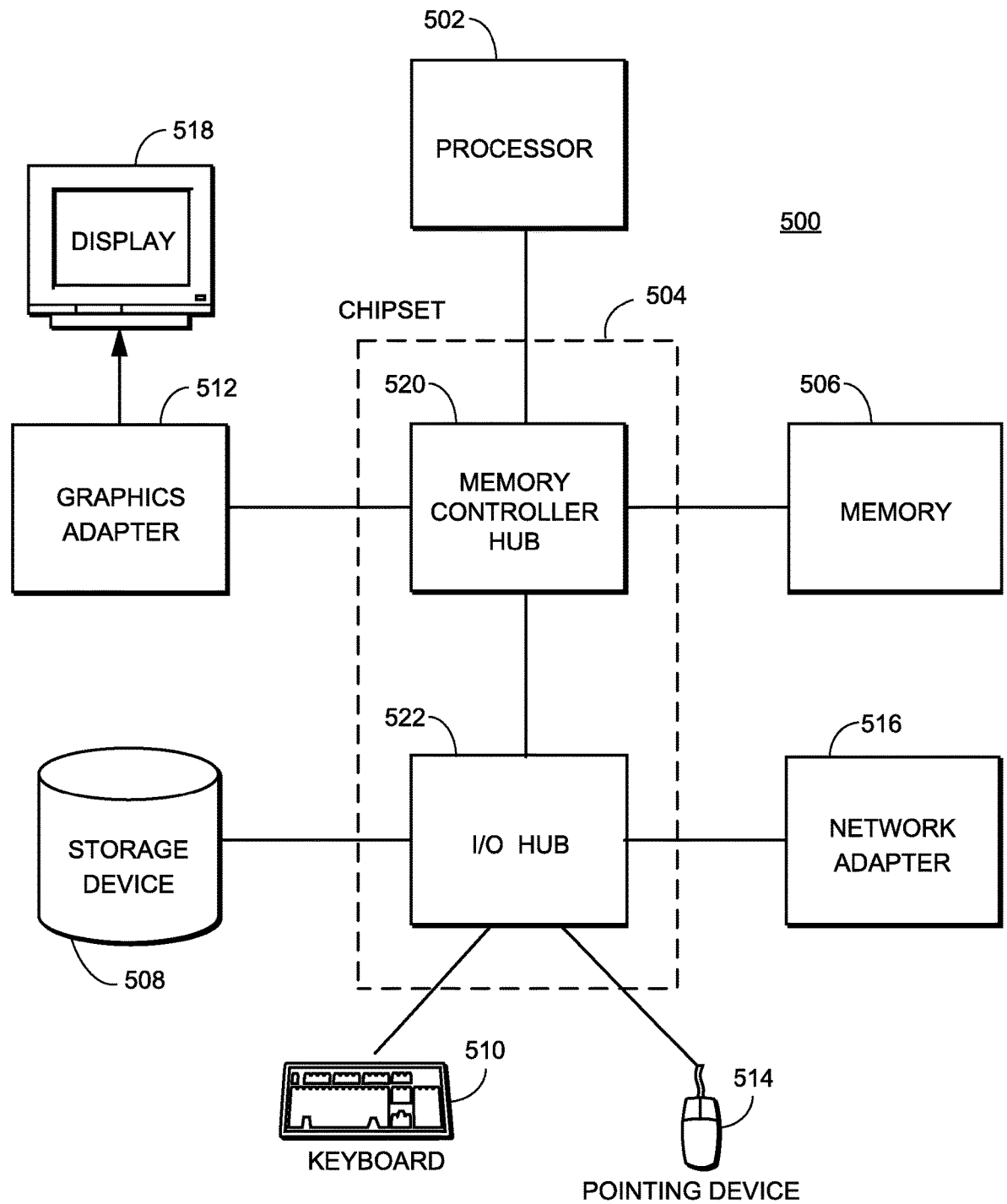
FIG. 5 is a high-level block diagram illustrating physical components of a computer used as part or all of one or more of the entities described herein in one embodiment.

FIG. 5 is a high-level block diagram illustrating physical components of a computer 500 used as part or all of one or more of the computing systems described herein in one embodiment. For example, instances of the illustrated computer 500 may be used as a server operating the system 130. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O hub 522. In another embodiment, the memory 506 is coupled directly to the processor 502 instead of the chipset 504. In one embodiment, one or more sound devices (e.g., a loudspeaker, audio driver, etc.) is coupled to chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer system 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    allocating users of an application to populations, a set of users in a first of the populations to receive a feature update for the application;
    performing a staged rollout of the feature update for the application, by at least once iteratively:
        pushing the feature update for the application to the set of users;
        monitoring the performance of the feature update for the application; and
        in response to determining the monitored performance is at or below a threshold statistical power metric to minimize negative impact of the feature update, reallocating users in a second of the populations into the first population to receive the feature update for the application; and
    when the feature update has been pushed to all users, determining that the staged rollout is complete.

2. The method of claim 1, wherein the reallocating is at least in part time-based according to a series of specified stages.

3. The method of claim 1, wherein the reallocating is at least in part risk-based according to a specified risk criteria and a performance metric for the feature update.

4. The method of claim 1, further comprising:
    evaluating the monitored performance of the feature update using one or more performance metrics;

determining, based on the performance metrics, that the feature update is performing unsuccessfully; and responsive to the determination, stopping the staged rollout for the feature update.

5. The method of claim 4, wherein the stopping is temporary and wherein the staged rollout for the feature update further comprises reallocating users of the first population to a third population of the populations to roll back the feature update.

6. The method of claim 4, wherein determining that the feature update is performing unsuccessfully further comprises determining that one or more of the performance metrics is below a specified threshold.

7. The method of claim 1, wherein determining the monitored performance is at or below the threshold statistical power metric comprises:

evaluating the monitored performance of the feature update using one or more performance metrics comprising the threshold statistical power metric; and determining, based on the performance metrics, that the feature update is performing successfully.

8. The method of claim 1, wherein monitoring the performance of the feature update further comprises:

monitoring the performance of the application associated with a population of users continuing to use a prior version; and determining a statistical variance between the performance of the feature update and the performance of the application associated with the population of users continuing to use the prior version.

9. A non-transitory computer-readable storage medium storing computer program instructions executable by a processor to perform operations comprising:

allocating users of an application to populations, a set of users in a first of the populations to receive a feature update for the application;

performing a staged rollout of the feature update for the application, by at least once iteratively:

pushing the feature update for the application to the set of users;

monitoring the performance of the feature update for the application; and in response to determining the monitored performance is at or below a threshold statistical power metric to minimize negative impact of the feature update, reallocating users of a second of the populations into the first population to receive the feature update for the application; and when the feature update has been pushed to all users, determining that the staged rollout is complete.

10. The computer-readable storage medium of claim 9, wherein the reallocating is at least in part time-based according to a series of specified stages.

11. The computer-readable storage medium of claim 9, wherein the reallocating is at least in part risk-based according to a specified risk criteria and a performance metric for the feature update.

12. The computer-readable storage medium of claim 9, wherein the operations further comprise:

evaluating the monitored performance of the feature update using one or more performance metrics;

determining, based on the performance metrics, that the feature update is performing unsuccessfully; and responsive to the determination, stopping the staged rollout for the feature update.

13. The computer-readable storage medium of claim 12, wherein the stopping is temporary and wherein the staged rollout for the feature update further comprises reallocating users of the first population to a third population of the populations to roll back the feature update.

14. The computer-readable storage medium of claim 12, wherein determining that the feature update is performing unsuccessfully further comprises determining that one or more of the performance metrics is below a specified threshold.

15. The computer-readable storage medium of claim 9, wherein determining the monitored performance is at or below the threshold statistical power metric comprises:

evaluating the monitored performance of the feature update using one or more performance metrics comprising the threshold statistical power metric; and determining, based on the performance metrics, that the feature update is performing successfully.

16. The computer-readable storage medium of claim 9, wherein monitoring the performance of the feature update further comprises:

monitoring the performance of the application associated with a population of users continuing to use a prior version; and determining a statistical variance between the performance of the feature update and the performance of the application associated with the population of users continuing to use the prior version.

17. A system comprising:

a computer processor for executing computer program instructions; and a non-transitory computer-readable storage medium storing computer program instructions executable by the processor to perform operations comprising:

allocating users of an application to populations, a set of users in a first of the populations to receive a feature update for the application;

performing a staged rollout of the feature update for the application, by at least once iteratively:

pushing the feature update for the application to the set of users;

monitoring the performance of the feature update for the application; and in response to determining the monitored performance is at or below a threshold statistical power metric to minimize negative impact of the feature update, reallocating users of a second of the populations into the first population to receive the feature update for the application; and when the feature update has been pushed to all users, determining that the staged rollout is complete.

18. The system of claim 17, wherein determining the monitored performance is at or below the threshold statistical power metric comprises:

evaluating the monitored performance of the feature update using one or more performance metrics comprising the threshold statistical power metric; and determining, based on the performance metrics, that the feature update is performing successfully.

* * * * *